United States Patent
Chou et al.

(10) Patent No.: US 11,422,952 B2
(45) Date of Patent: Aug. 23, 2022

(54) WIRELESS INPUT APPARATUS

(71) Applicant: ASUSTEK COMPUTER INC., Taipei (TW)

(72) Inventors: Shih-Hung Chou, Taipei (TW); Chih-Yuan Lin, Taipei (TW); Kuo-En Lin, Taipei (TW); Xin-Han Cai, Taipei (TW); I-Ting Hsieh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/334,532

(22) Filed: May 28, 2021

(65) Prior Publication Data

US 2021/0374076 A1 Dec. 2, 2021

(30) Foreign Application Priority Data

Jun. 1, 2020 (CN) .......................... 202010485739.1

(51) Int. Cl.
*G06F 13/10* (2006.01)
*G06F 3/02* (2006.01)
*G06F 3/038* (2013.01)

(52) U.S. Cl.
CPC .............. *G06F 13/102* (2013.01); *G06F 3/02* (2013.01); *G06F 3/038* (2013.01); *G06F 2203/0384* (2013.01)

(58) Field of Classification Search
CPC .......... G06F 13/102; G06F 3/02; G06F 3/038; G06F 2203/0384
USPC ........................................................ 710/73
See application file for complete search history.

(56) References Cited

U.S. PATENT DOCUMENTS

| | | | |
|---|---|---|---|
| 8,712,245 B1* | 4/2014 | Alao ...................... | G08C 19/36 398/118 |
| 9,030,482 B2 | 5/2015 | Han et al. | |
| 10,713,185 B2 | 7/2020 | Chazot et al. | |
| 11,200,188 B1* | 12/2021 | Chen ........................ | H04B 1/38 |
| 2004/0158750 A1* | 8/2004 | Syed ...................... | G06F 1/3287 713/320 |
| 2005/0130745 A1* | 6/2005 | Dernis .................... | A63F 13/95 463/43 |

(Continued)

FOREIGN PATENT DOCUMENTS

CN 110727623 A 1/2020

*Primary Examiner* — Christopher B Shin
(74) *Attorney, Agent, or Firm* — Muncy, Geissler, Olds & Lowe, P.C.

(57) ABSTRACT

A wireless input apparatus is provided, applied to a computer host. The wireless input apparatus includes a wireless dongle and an input module. The wireless dongle is physically connected to the computer host to receive an effect command, and includes a data segmentation unit and a first transceiver unit. The data segmentation unit segments the effect command into a plurality of data segments. The first transceiver unit sequentially transmits the plurality of data segments outwards. The input module includes a second transceiver unit, a merging unit, an effect generation unit, and a control unit. The second transceiver unit is coupled to the first transceiver unit to sequentially receive the plurality of data segments. The merging unit merges the plurality of data segments into the effect command. The control unit receives the effect command, and controls the effect generation unit to generate an effect according to the effect command.

9 Claims, 6 Drawing Sheets

(56) References Cited

U.S. PATENT DOCUMENTS

| | | | |
|---|---|---|---|
| 2006/0007126 A1* | 1/2006 | Shih | G06F 3/0231 |
| | | | 345/156 |
| 2006/0084504 A1* | 4/2006 | Chan | A63F 13/06 |
| | | | 463/39 |
| 2013/0124877 A1* | 5/2013 | Saito | H04L 67/1097 |
| | | | 713/193 |
| 2013/0178294 A1* | 7/2013 | Wang | A63F 13/02 |
| | | | 463/37 |
| 2013/0282928 A1* | 10/2013 | Winestein | G06F 3/0659 |
| | | | 710/63 |
| 2014/0184386 A1* | 7/2014 | Regler | G09F 27/00 |
| | | | 340/7.61 |
| 2016/0171802 A1* | 6/2016 | Fountain | G07C 5/08 |
| | | | 701/31.4 |
| 2019/0235880 A1* | 8/2019 | Wu | G06F 9/4415 |

* cited by examiner

WIRELESS INPUT APPARATUS

CROSS-REFERENCE TO RELATED APPLICATION

This application claims the priority benefit of Chinese application serial No. 202010485739.1, filed on Jun. 1, 2020. The entirety of the above-mentioned patent application is hereby incorporated by reference herein and made a part of the specification.

BACKGROUND OF THE INVENTION

Field of the Invention

The disclosure relates to an input apparatus, and specifically to a wireless input apparatus.

Description of the Related Art

An input apparatus, such as a keyboard and a computer mouse, is connected to a computer host for operation. To increase usage applications, numerous input apparatuses are equipped with effect generators, which generate light, sound, or vibration according to user operations.

The input apparatuses are connected to computer hosts not only in a wired connection manner (such as a universal serial bus, USB), but also in a wireless connection manner to improve practicality of the input apparatuses.

In the case of wireless connection, the computer hosts and the input apparatuses communicate each other through communication protocols. Due to the transmission limitation of data length, the computer host cannot transmit a long control command to the input apparatus to control the input apparatus and generate diversified effects through the communication protocol.

BRIEF SUMMARY OF THE INVENTION

The disclosure provides a wireless input apparatus. The wireless input apparatus is applied to a computer host. The computer host generates an effect command to control the wireless input apparatus. The wireless input apparatus includes a wireless dongle and an input module. The wireless dongle is physically connected to the computer host to receive the effect command.

The wireless dongle includes a data segmentation unit and a first transceiver unit. The data segmentation unit is configured to segment the effect command into a plurality of data segments. The first transceiver unit is configured to sequentially transmit the plurality of data segments outwards in a wireless manner.

The input module includes a second transceiver unit, a merging unit, an effect generation unit, and a control unit. The second transceiver unit is coupled to the first transceiver unit to sequentially receive the plurality of data segments. The merging unit is configured to merge the foregoing plurality of data segments into the effect command. The control unit is electrically connected to the merging unit and the effect generation unit, and is configured to receive the effect command, and control the effect generation unit to generate an effect according to the effect command.

The wireless input apparatus provided in the disclosure segments the effect command from the computer host into the plurality of data segments, and then transmits the plurality of data segments wirelessly, which avoids transmission limitation and allow the wireless input apparatus to generate diversified effects, and application variety of the wireless input apparatus is improved.

DETAILED DESCRIPTION OF THE EMBODIMENTS

More detailed descriptions of the specific embodiments of the disclosure are provided below with reference to the accompanying drawings. The advantages and features of the disclosure will become more apparent from the following description and related application document. It is to be noted that the drawings are all in a very simplified form and are not drawn to accurate scale, but are merely used for convenience and clarity of description of the embodiments of the disclosure.

Figure 1:
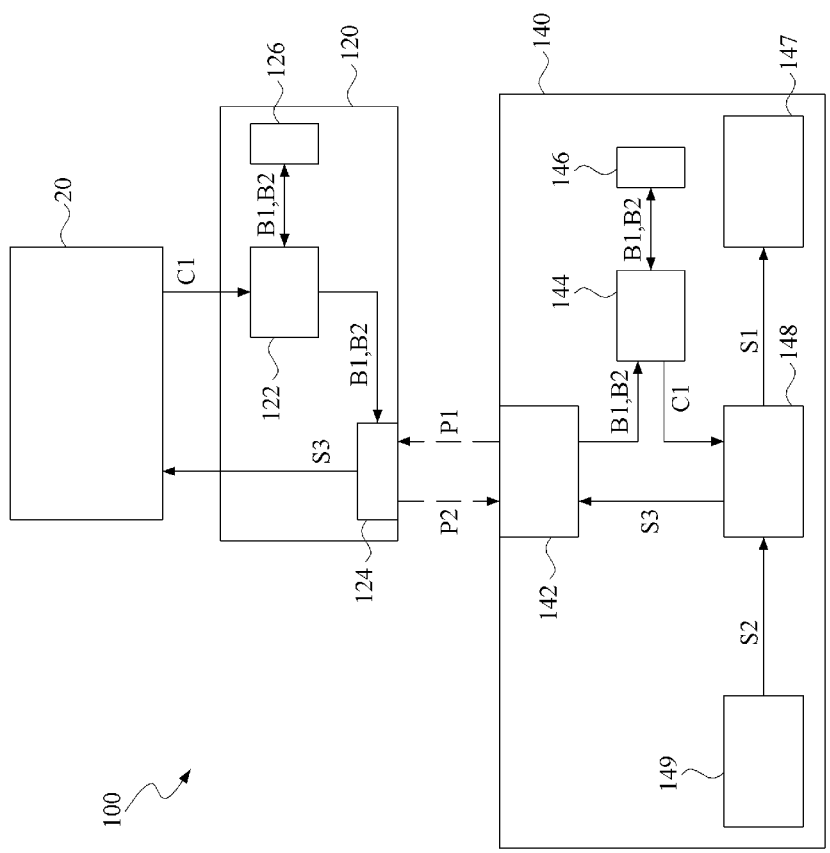
FIG. 1 is a schematic block diagram of a wireless input apparatus according to an embodiment of the disclosure.

FIG. 1 is a schematic block diagram of a wireless input apparatus according to an embodiment of the disclosure. A wireless input apparatus 100 is applied to a computer host 20. The wireless input apparatus 100 is a wireless keyboard or a wireless mouse. The computer host 20 is an electronic apparatus installed with an operating system and outputting a control command, such as a desktop computer, a notebook computer, or a mainboard.

As shown in the figure, the wireless input apparatus 100 includes a wireless dongle 120 and an input module 140. The wireless dongle 120 is physically connected to the computer host 20 to receive an effect command C1 from the computer host 20. In an embodiment, the wireless dongle 120 is connected to the computer host 20 by using a universal serial bus (USB), and is supplied with power by using the computer host 20.

Figure 2:
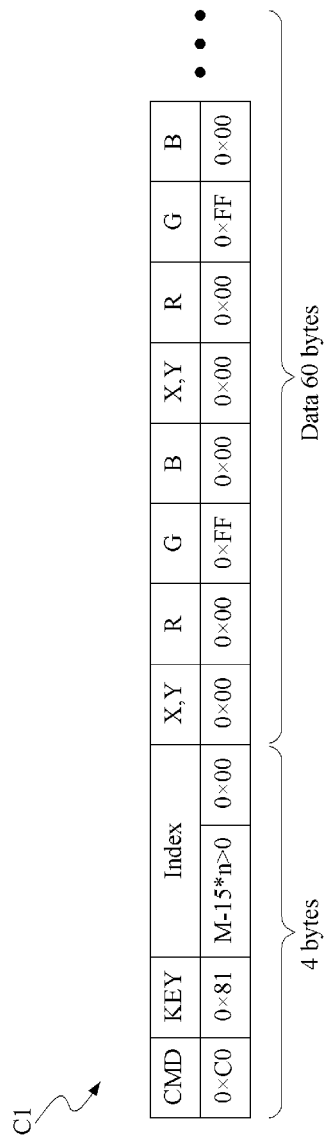
FIG. 2 is a schematic diagram of an effect command received by a wireless input apparatus according to an embodiment of the disclosure.

In an embodiment, the effect command C1 is a control command generated by the computer host 20 in a software mode. In an embodiment, referring to FIG. 2, FIG. 2 is a schematic diagram of an effect command received by a wireless input apparatus according to an embodiment of the disclosure. As shown in the figure, the effect command C1 is a multi-byte data string, including a CMD byte and a KEY byte located in a front end, followed by effect data. A length of the multi-byte data string is mainly defined by a volume of the effect data required to be transmitted.

For example, when 15 light emitting diodes (LEDs) are controlled to generate light effects, each of the LEDs needs 4-byte light effect data, and then 60-byte effect data needs to be transmitted in total. The length of the data string of the entire effect command C1 reaches 64 bytes after index bytes are added.

The wireless dongle 120 includes a data segmentation unit 122, a first transceiver unit 124 and a first storage unit 126. The data segmentation unit 122 is configured to segment the effect command C1 from the computer host 20 into a plurality of data segments B1 and B2. The first storage unit 126 is electrically connected to the data segmentation unit 122, and is configured to temporarily store the plurality of data segments B1 and B2 generated by the data segmentation unit 122, to wait for a data transmitting time point.

In an embodiment, the first storage unit 126 is a random access memory (RAM), and a storage capacity of the first storage unit 126 depends on the length of the effect command C1. In an embodiment, the storage capacity of the first storage unit 126 is equal to the length of the effect command C1.

The input module 140 includes a second transceiver unit 142, a merging unit 144, a second storage unit 146, an effect generation unit 147, and a control unit 148. The second transceiver unit 142 is coupled to the first transceiver unit 124 to sequentially receive the plurality of data segments B1 and B2 from the first transceiver unit 124. In an embodiment, the second transceiver unit 142 and the first transceiver unit 124 match each other.

The merging unit 144 is configured to merge the plurality of data segments B1 and B2 into the effect command C1. The second storage unit 146 is electrically connected to the second transceiver unit 142, and is configured to temporarily store the plurality of data segments B1 and B2 received by the second transceiver unit 142.

After the data segments B1 and B2 are stored completely, the merging unit 144 merges the data segments B1 and B2. In an embodiment, the second storage unit 146 is a RAM, and a storage capacity of the second storage unit 146 depends on the length of the effect command C1. In an embodiment, the storage capacity of the second storage unit 146 is equal to the length of the effect command C1.

In this embodiment, the 64-byte effect command C1 is segmented into two 32-byte data segments B1 and B2 to be transmitted, but this embodiment is not limited thereto. In an embodiment, when the length of the effect command C1 required to be transmitted is relatively long, the data segmentation unit 122 segments the effect command C1 into more data segments to be transmitted. In addition, lengths of the data segments are not required to be the same.

In an embodiment, the data segmentation unit 122 segments, according to a preset data length, the effect command C1 into a plurality of data segments to be transmitted. In other words, the preset data length is a maximum data length allowed to be transmitted between the first transceiver unit 124 and the second transceiver unit 142.

In addition, in an embodiment, when the length of the effect command C1 is less than or equal to the preset data length, alternatively, the wireless dongle 120 does not perform data segmentation, but transmits the effect command C1 outwards directly.

The effect generation unit 147 is disposed on the input module 140 to generate an effect. In an embodiment, the effect generation unit 147 is a light effect generation element, including a light emitting module formed by a plurality of LED elements or a light bar. In an embodiment, the effect generation unit 147 is a sound effect generation element, such as a speaker.

In an embodiment, the effect generation unit 147 is a vibration generation apparatus. The control unit 148 is electrically connected to the merging unit 144 and the effect generation unit 147, to receive the effect command C1 generated by the merging unit 144 by merging the data segments B1 and B2, and generate a control signal S1 according to the effect command C1 to control the effect generation unit 147 to generate an effect.

A communication packet for transmitting a user input signal between the wireless dongle 120 and the input module 140 is directly used for transmitting the data segments B1 and B2 in the disclosure.

In an embodiment, when the input module 140 is a keyboard module and a user taps a key 149, a trigger signal S2 is generated. The control unit 148 generates an input signal S3 according to the trigger signal S2.

The control unit 148 is electrically connected to the second transceiver unit 142, and is configured to transform the input signal S3 into an input signal packet P1 by using the second transceiver unit 142 and transmit the input signal packet P1 to the first transceiver unit 124 of the wireless dongle 120.

After confirming that the input signal packet P1 is received, the first transceiver unit 124 transmits a piece of acknowledgement information P2 to the second transceiver unit 142. The data segments B1 and B2 are transmitted to the second transceiver unit 142 together with the acknowledgement information P2. Therefore, transmission of the data segments B1 and B2 does not interfere with input operations originally performed by the user by using the input module 140.

For segmentation and merging manners of the data segments B1 and B2 and transmission timing of the data segments B1 and B2, more detailed descriptions are made in the following paragraphs.

Figure 3:
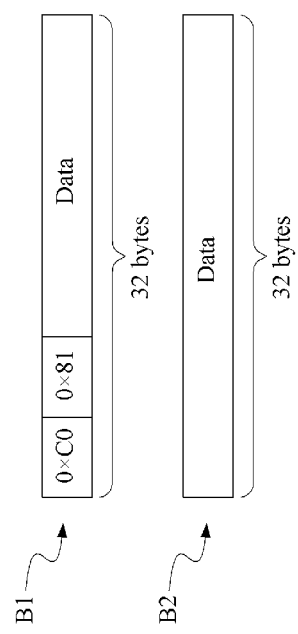
FIG. 3 is a schematic diagram of a wireless input apparatus segmenting an effect command generated by a computer host into data segments according to an embodiment of the disclosure.

FIG. 3 is a schematic diagram of a wireless input apparatus segmenting an effect command generated by a computer host into data segments according to an embodiment of the disclosure. The effect command C1 is a control command generated by a computer host 20 in a software mode. As shown in the figure, the effect command C1 includes a CMD byte and a KEY byte located in a front end, followed by effect data. Description is made by using an example of a 64-byte effect command C1.

The 64-byte effect command C1 is segmented by the data segmentation unit 122 to generate two 32-byte data segments B1 and B2. A group of CMD and KEY bytes are in the front end of the effect command C1, that is, 0xC0 and 0x81.

Therefore, when the first two bytes of the 32-byte data segment B1 received by a receiving end (that is, an input module 140) are 0xC0 and 0x81, the 32-byte data segment B1 is definitely a first half of the 64-byte effect command C1, and the following received 32-byte data segment B2 is definitely a second half of the effect command C1. The data segments B1 and B2 are merged to obtain the complete 64-byte effect command C1.

Figure 4:
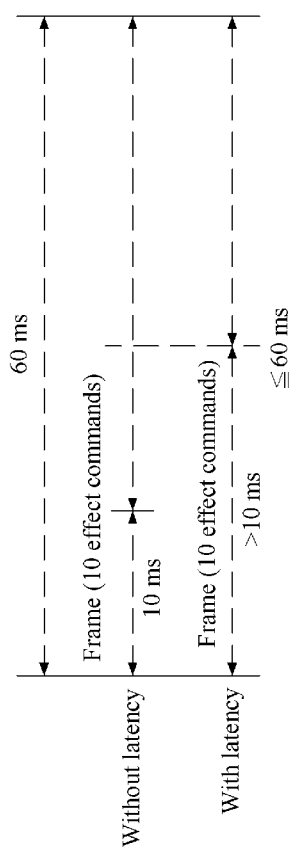
FIG. 4 is a timing diagram of a wireless input apparatus transmitting data in a wireless manner according to an embodiment of the disclosure.

FIG. 4 is a timing diagram of a wireless input apparatus transmitting data in a wireless manner according to an embodiment of the disclosure. A computer host 20 in this embodiment transmits a frame of effect data to an input module 140 every 60 ms for control to generate dynamic effects.

Each frame of effect data includes ten 64-byte effect commands C1, and each of the effect commands C1 includes light effect data of 15 LEDs, so that light effects of up to 150 LEDs are controlled. It takes only 1 ms to transmit data of each of the effect commands C1. Without any delay, it takes only 10 ms to complete transmission of effect data of the entire frame.

Wireless data transmission is affected by factors such as distance and frequency interference, which causes latency in the data transmission. However, because the computer host 20 transmits each frame of effect command C1 at an interval of 60 ms, even though the data transmission has latency, the effect data of the entire frame is still transmitted within 60 ms. In addition, as human eyes have a feature of persistence of vision, such a transmission speed does not cause the user to perceive the latency of the light effect.

Figure 5:
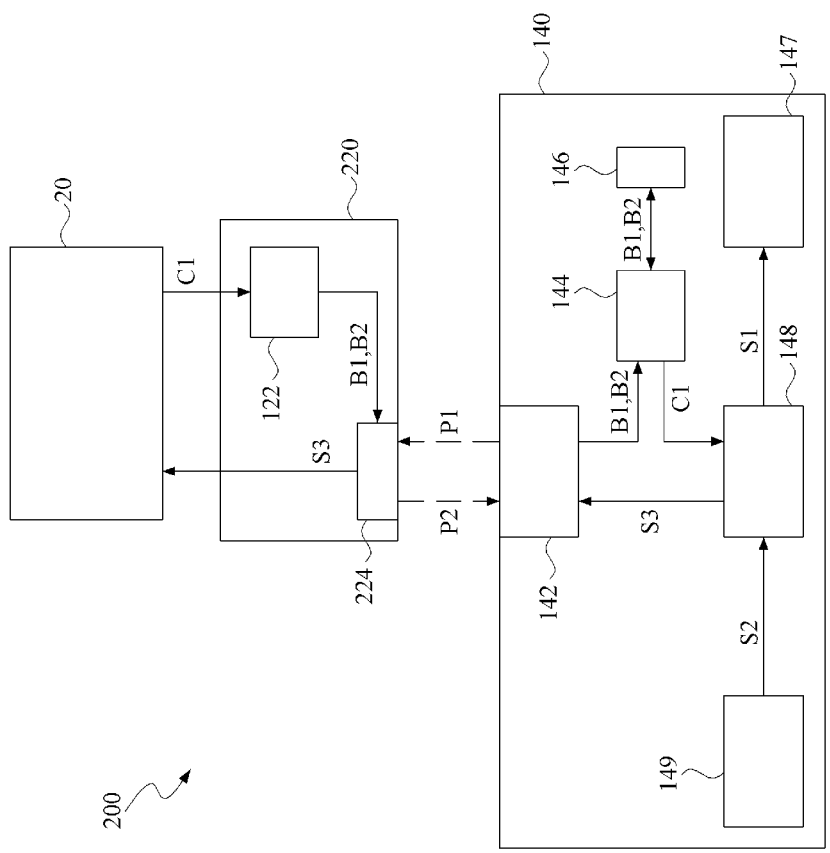
FIG. 5 is a schematic block diagram of a wireless input apparatus according to another embodiment of the disclosure.

FIG. 5 is a schematic block diagram of a wireless input apparatus according to another embodiment of the disclosure. Compared with the embodiment in FIG. 1, a wireless dongle 220 of a wireless input apparatus 200 of this embodiment omits a first storage unit 126, and an internal memory of a first transceiver unit 224 is directly used for storing data segments B1 and B2 to decrease hardware costs. In the embodiment, the length of the effect command C1 does not exceed a capacity of the internal memory of the first transceiver unit 224.

The foregoing embodiment omits the first storage unit 126 in the wireless dongle 120, and directly uses the internal memory of the first transceiver unit 224 to store the data segments B1 and B2, but the foregoing embodiment is not limited thereto. In an embodiment, a second storage unit 146 in an input module 140 is also omitted, and an internal memory of a second transceiver unit 142 is directly used for storing the data segments B1 and B2.

Figure 6:
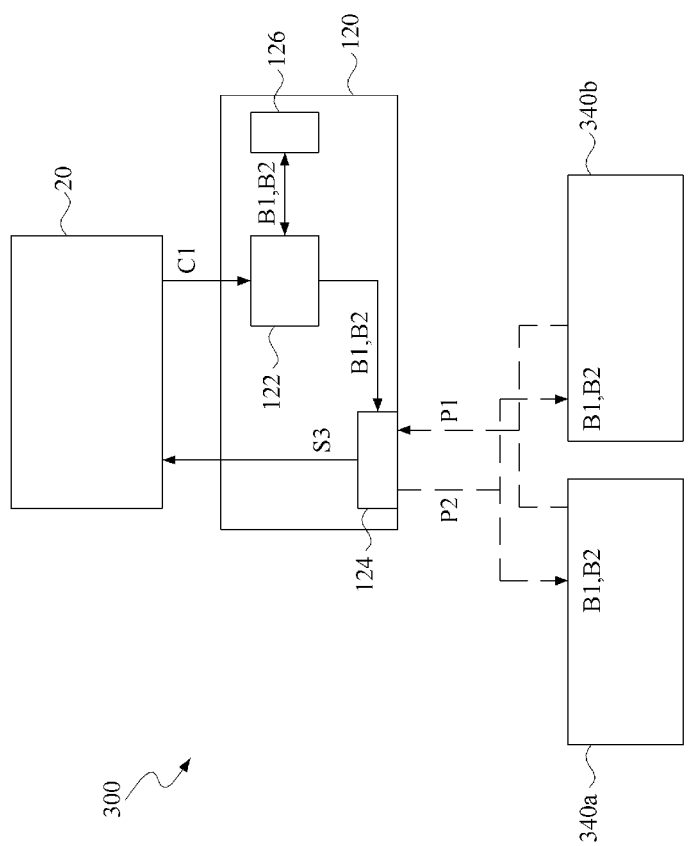
FIG. 6 is a schematic block diagram of a wireless input apparatus according to yet another embodiment of the disclosure.

FIG. 6 is a schematic block diagram of a wireless input apparatus according to yet another embodiment of the disclosure. Compared with the embodiment of FIG. 1, a wireless input apparatus 300 of this embodiment includes two input modules 340a and 340b, such as a keyboard module and a mouse, and a wireless dongle 120 is paired with the input modules 340a and 340b for control.

A plurality of data segments B1 and B2 generated by a data segmentation unit 122 of the wireless dongle 120 is synchronously transmitted to the two input modules 340a and 340b, and the two input modules 340a and 340b selectively generate effects according to a received effect command C1.

In an embodiment, the effect command C1 only controls the input module 340a, or controls the two input modules 340a and 340b simultaneously. Architectures of the input modules 340a and 340b are similar to that of the input module 140 in FIG. 1. Details are not described herein.

The wireless input apparatuses 100, 200, and 300 provided in the disclosure segment the effect command C1 from the computer host 20 into the plurality of data segments B1 and B2, and then transmit the plurality of data segments B1 and B2 to the input modules 140, 340a, and 340b in a wireless manner to generate effects, which avoids that a long control command cannot be transmitted conventionally, so that the wireless input apparatus generates diversified effects, and practicality of the wireless input apparatus is improved.

The foregoing descriptions are merely preferred embodiments of the disclosure and are not intended to limit the disclosure in any way. Any person skilled in the art can make any form of equivalent replacement or modification to the technical means and technical contents in the disclosure without departing from the scope of the technical means of the disclosure, and such equivalent replacement or modification does not depart from the contents of the technical means of the disclosure and still falls within the protection scope of the disclosure. Although the disclosure is described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A wireless input apparatus, applied to a computer host generating an effect command, the wireless input apparatus comprising:
   a wireless dongle, configured to receive the effect command, the wireless dongle comprising:
      a data segmentation unit, configured to segment the effect command into a plurality of data segments; and
      a first transceiver unit, configured to sequentially transmit the plurality of data segments outwards in a wireless manner; and
   an input module, comprising:
      a second transceiver unit, coupled to the first transceiver unit, configured to sequentially receive the plurality of data segments;
      a merging unit, configured to merge the plurality of data segments into the effect command;
      an effect generation unit; and
      a control unit, electrically connected to the merging unit and the effect generation unit, configured to receive the effect command, and control the effect generation unit to generate an effect according to the effect command.

2. The wireless input apparatus according to claim 1, wherein the input module is a keyboard module, and the control unit is electrically connected to the second transceiver unit, to transmit an input signal to the wireless dongle by using the second transceiver unit.

3. The wireless input apparatus according to claim 1, wherein the effect generation unit comprises a light effect generation element.

4. The wireless input apparatus according to claim 1, wherein the effect generation unit comprises a sound effect generation element.

5. The wireless input apparatus according to claim 1, wherein the wireless dongle further comprises a first storage unit, and the first storage unit is electrically connected to the data segmentation unit, to store the plurality of data segments.

6. The wireless input apparatus according to claim 1, wherein the input module further comprises a second storage unit, and the second storage unit is electrically connected to the second transceiver unit, to store the plurality of data segments.

7. The wireless input apparatus according to claim 1, wherein the second transceiver unit is configured to transmit an input signal packet to the first transceiver unit, the first transceiver unit is configured to transmit acknowledgement information to the second transceiver unit, and the data segments are transmitted to the second transceiver unit together with the acknowledgement information.

8. The wireless input apparatus according to claim 1, wherein the input module comprises a wireless keyboard.

9. The wireless input apparatus according to claim 1, wherein the input module comprises a wireless mouse.

* * * * *